United States Patent [19]

Op de Beek

[11] Patent Number: 5,787,170
[45] Date of Patent: Jul. 28, 1998

[54] DATABASE SYSTEM WITH LOCAL INFORMATION REMOTELY SUPPORTED WITH DYNAMIC INFORMATION

[75] Inventor: Franciscus J. Op de Beek, Amersfoort, Netherlands

[73] Assignee: U.S. Philips Corporation, New York, N.Y.

[21] Appl. No.: 944,111

[22] Filed: Oct. 6, 1997

Related U.S. Application Data

[63] Continuation of Ser. No. 540,518, Oct. 6, 1995.

[30] Foreign Application Priority Data

Oct. 10, 1994 [EP] European Pat. Off. ............ 94202918

[51] Int. Cl.$^6$ .................... H04L 9/00; G08G 1/123; G01C 21/00
[52] U.S. Cl. .................... 380/4; 340/990; 340/995; 364/449.2; 364/449.4
[58] Field of Search ............ 380/3, 4; 364/449.2–449.6; 340/990–995

[56] References Cited

U.S. PATENT DOCUMENTS

| | | |
|---|---|---|
| 4,595,950 | 6/1986 | Lofberg . |
| 5,172,321 | 12/1992 | Ghaem et al. . |
| 5,185,857 | 2/1993 | Rozmanith et al. ............ 395/148 |
| 5,247,575 | 9/1993 | Sprague et al. ............ 380/9 |
| 5,371,792 | 12/1994 | Asai et al. ............ 380/3 |
| 5,394,469 | 2/1995 | Nagel et al. ............ 380/4 |
| 5,450,489 | 9/1995 | Ostrover et al. ............ 380/5 |
| 5,563,947 | 10/1996 | Kikinis ............ 380/4 |

*Primary Examiner*—Stephen C. Buczinski
*Attorney, Agent, or Firm*—Brian J. Wieghaus

[57] ABSTRACT

A database system comprises an individual station with berth means for receiving an optically readable information carrier with local information. The system reads the carrier and furthermore receives remotely supplied secondary information. It has a processor for processing both local information and secondary information to produce output information, and a user interface for presenting said output information to a user. In particular, the carrier has a read-only part, and a write part for storage of at least one decryption key. The processor is arranged for decrypting the secondary information using said at least one decryption key.

19 Claims, 1 Drawing Sheet

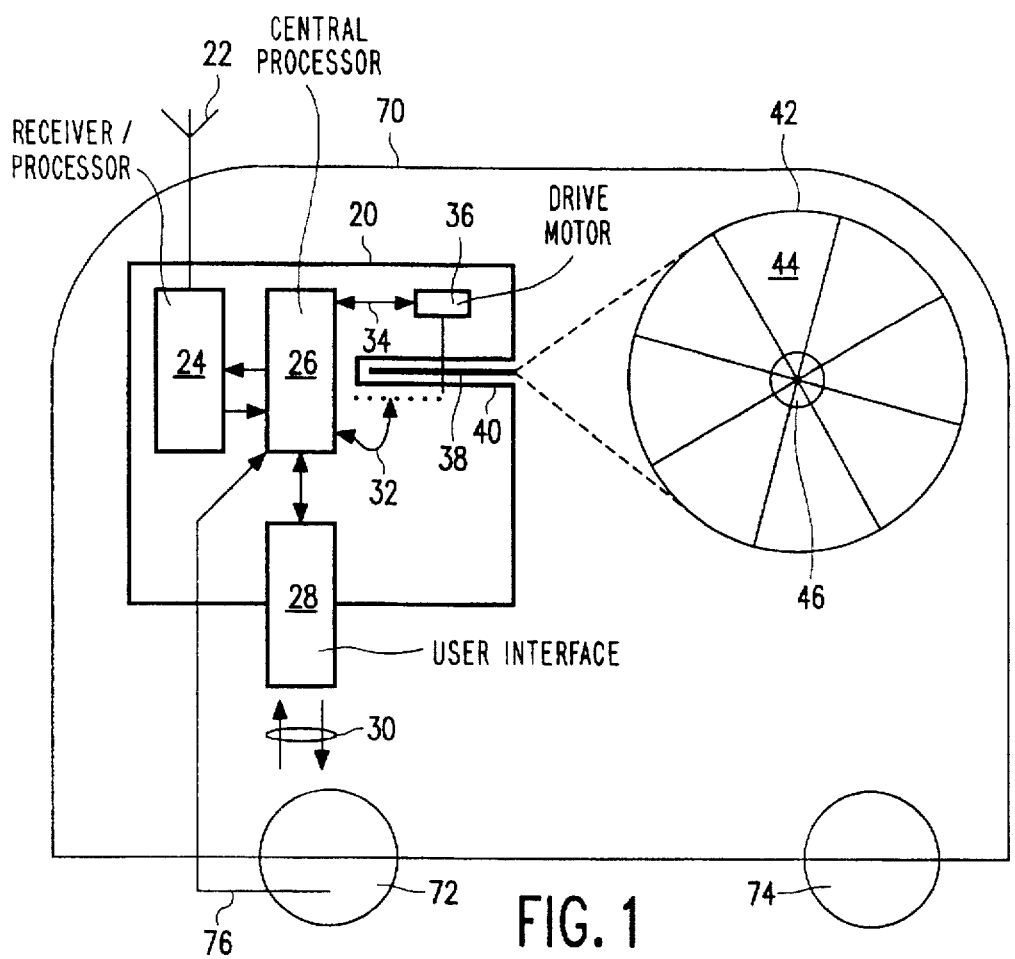
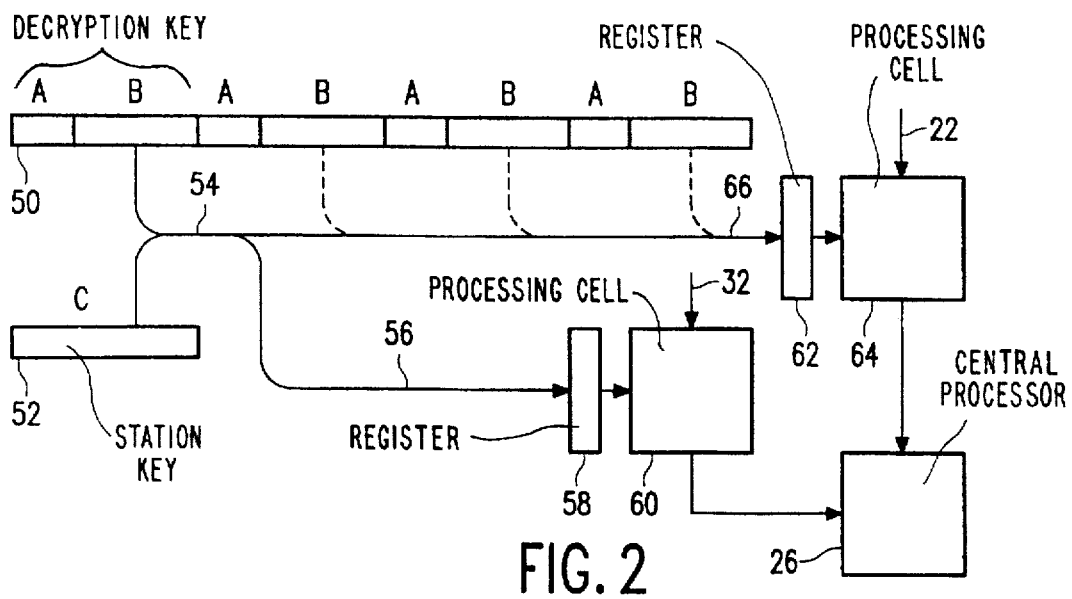

DATABASE SYSTEM WITH LOCAL INFORMATION REMOTELY SUPPORTED WITH DYNAMIC INFORMATION

This is a continuation of application Ser. No. 08/540,518, filed Oct. 6, 1995.

BACKGROUND OF THE INVENTION

Field of the Invention

The invention relates to a database system comprising an individual station having berth means for receiving an optically readable information carrier with local information, and read means for reading said carrier, receiving means for receiving remotely supplied secondary information, processing means for processing local information so read and also said secondary information to produce output information, and user interface means for presenting said output information to a user.

A typical environment wherein a local and individual station accesses both local information and remotely supplied secondary information is found in a car information, or more specifically, car navigation environment, such as discussed for example in EP 94201259.2, corresponding U.S. application Ser. No. 08/433,669; and EP 94201763.3, corresponding U.S. application Ser. No. 08/491,190 to the same assignee, herein incorporated by reference. Therein, the local database is CDROM that generally contains static map data in the broadest sense, and the remote supplier is a broadcast organization that provides dynamic secondary information on actual traffic conditions such as adverse weather conditions, traffic jams or recent changes to the road network. The processing combines the two types of information for optimum routeplanning that provides the shortest or quickest route between user-presented start and destination items. Other usages in a land vehicle environment may have time-limited events specified in the secondary information, such as sports games or shows. The user may want to have such events displayed on the map; alternatively, these could be taken in consideration for the routeplanning method.

Furthermore, the present invention can be used in other environments, for example guided tours that use portable CDROM players, together with a broadcast personal address organization. The discussion hereinafter will center on the car navigation embodiment, which should not be considered as an implied limitation.

Now generally, the map data varies on a slow timescale that is typically months; on the other hand, the traffic conditions vary on a fast timescale of hours or even faster. Commercial exploitation and associated distribution of the database require an appropriate system for acquiring adequate remuneration, with respect to providing the map data and/or with respect to providing the traffic condition data. It has proven unfeasible to record actual usage of the data base by each individual user, especially in the case where the secondary information is broadcast. Moreover, it would be advantageous to signal that either the map data as stored is stale, or that it can no longer be used in combination with the actual secondary information. In the latter case a particular signalization of traffic conditions could optimally lead to selecting a particular route deviation from the stationary database, which however would not be present anymore in the actual physical situation. Both types of situations should compel the user to quickly acquire an updated version of the data base.

SUMMARY OF THE INVENTION

In consequence, amongst other things it is an object of the present invention to render the validity of the information carrier as such time dependent, while also blocking copying thereof for usage in another instance of the system.

Now, according to one of its aspects, the invention is characterized in that said carrier has a read-only part, and furthermore a write part accommodating storage of at least one decryption key, said processing means being arranged for decrypting said secondary information using said at least one decryption key. Recently, optical carriers such as Compact Disc have been presented with a partial write area, allowing an extended field of use of such carriers. Now, with time, the provider of the secondary information may choose a different encryption key, so that the decrypting key may no longer be valid.

Advantageously, said write part accommodates a plurality of locations for a plurality of respective decryption keys, and said processing means being arranged for selecting among said plurality of decryption keys according to a predetermined selecting time schedule, for decrypting said secondary information in a time limited manner using the decryption key so selected. This may be used for further discrimination among validity periods of the optical carrier, or alternatively, for discrimination among various services or levels of service. Again, each particular decryption key may be limited in its validity period.

Advantageously, said individual station comprises an individual station key, and anyone of said at least one decryption key is privy to said individual station key. In this way, the disc is personalized versus the station in question.

Advantageously, said processing means is arranged for decrypting said secondary information using a first aggregate of said individual station key and said at least one decryption key, which first aggregate varies with said decryption key. In this way, the secondary information can only be accessed through a valid data carrier.

Advantageously, said station is arranged for decrypting said local information using a second aggregate of the station key and a decryption key present on said carrier, which second aggregate is invariant to said actually selected decryption key. In this way, both local and secondary informations need to be presented at any instant in only a single version.

The invention also relates to a carrier for use with a database system according to the invention, to a motor vehicle comprising such database system, and to a database supersystem comprising a multitude of individual database systems according to the above. Various further advantageous aspects are recited in dependent claims.

BRIEF DESCRIPTION OF THE DRAWINGS

These and other aspects and advantages win be discussed hereinafter with reference to the disclosure of preferred embodiments, and in particular with reference to the appended Figures that show:

FIG. 1 shows a motor vehicle provided with a database system according to the invention;

FIG. 2 shows a decryption key system for the invention.

DETAILED DESCRIPTION OF THE PREFERRED EMBODIMENTS

FIG. 1 shows a motor vehicle provided with a database system according to the invention. The vehicle is depicted schematically by means of car body 70 and wheels 72, 74. Furthermore, block 20 represents the individual station. As explained, the database system may be used in various other environments. The station is provided with a player for a CDROM disc 38 that is shown inserted in an appropriate berth 40. This berth may be constructed in a way known for commercially available CDROMs; the CDROM disc is removable. Also shown is a mechanical drive motor 36 with a bidirectional connection 34 to central processor 26 for exchanging drive control commands and driving speed sensor signals with the processor. Element 32 represents a reading head mechanism with associated servo subsystems for track following, focusing, signal amplification, and bit discrimination, and possibly code byte reconstruction, so that processor 26 receives a stream of formatted code bytes possibly provided with erasure flags or other qualification information. On the other hand, reading head mechanism from processor 26 receives control signals such as track addresses for accessing from the CDROM exactly the necessary information. The information received from CDROM 36 therewith represents road map information of a region that is suitably chosen under control of processor 26.

Processor 26 has a bidirectional communication with a symbolically indicated user interface mechanism 28 that has actuators such as keyboard or mouse, and a user output mechanism such as display or speech channel, thereby constituting bidirectional channel 30. Furthermore, antenna 22 receives secondary information such as dynamic traffic data. The medium for transfer may be cellular radio, other types of broadcast or otherwise. The content of the secondary information may be traffic information. Alternatively or supplementarily, the secondary information may be amendments on the map data that have occurred through road reconstruction, road damage or changed traffic regulations. The secondary information is provisionally processed in block 24 that may contain RAM facilities, in similar way as described for the CDROM information. It may be organized in a secondary database. The contents of the primary database may be supplemented and/or updated, first, by changes in road or traffic conditions, second in case of persistent changes with respect to the CDROM data, by a more or less cyclic organization of the broadcasting. The processor may then take up the change information according to need. If broadcast by cellular radio, the secondary information may be limited to the information considered relevant to the actual radio cell, for example, limited to no more than a predetermined set of surrounding cells thereof. The secondary information so taken up is selectively sent to processor 26 under control of processor request signals.

A user person may now input present position and destination. The processor then selects adequate map data from CDROM and calculates a global route. Next, from block 24 any dynamic traffic data is selected as far as necessary for complementing the static map data. The combined informations now allow the processor to calculate an optimum route for the vehicle. Qualifications to the route may be given on grounds of easy driving, fuel economy, early arrival, scenic roadsides, but also for reasons of fleet management, such as the realization of a rendez vous with another vehicle, or an intermediate visit to a particular customer. The calculations take the map data, together with the secondary information to get the optimum route. If no route is possible, a default indication is given. When the route has been found, the progress of the vehicle along this route is ascertained by means of odometer, compass, and possibly other facilities, to determine actual position. This has been symbolically represented by means of interconnection 76 for the case of an odometer. As based on such actual position, the system by means of audio or video indications directs the driver actions that must be executed next.

Conventionally, the data from the map, as well as the secondary information are in cleartext, so that no decryption thereof should be necessary other than by a generally known key. According to the invention however, a certain amount of data is presented in encrypted form. This may pertain to all data, to critical data only, or to a more or less arbitrary selection amongst the data. In particular, the secondary data may be encrypted. The key may be provided in various ways.

First, the station in question may have a station key, for example, a four-digit number that is stored inside processor 26, and which identifies the station in question. This key is loaded upon manufacturing of the system, but need not be unique to the station. The station key may have an infinitely long validity interval. Second, the CDROM disc 42, shown once more, has two distinct regions. The first region is a relatively large read-only region 44 that is shown divided into sectors. Such read-only field is realized by first writing the information serially into a master carrier. Next, some kind of press-type mechanism is used for producing multiple replicas of the master carrier. This technology is in wide use.

The second region is a relatively small writable region 46, that allows for the writing of one or more decryption keys. On one hand, such write part corresponds to the serial write part of the master-type carrier. The difference is, first that two different types of information area are present on the carrier, and second, that the write part must now be able to survive in the less controlled environment of everyday life. In the context of the present invention, a 'write part' refers to one or more carrier tracks that allow serial writing. Various different technologies have been proposed: the simplest is write-once, wherein a bit, once written, can no more be reversed. A somewhat more complicated technology allows the bits to be reversed, so that new decryption keys and/or new non-key information may be overwritten over old information. The rewriting may be done at special apparatus that are located at some category of vendor. In other cases such rewriting could even be done within the remote station such as the vehicle in question.

Now, each decryption key may have a unique and prespecified validity interval. If a plurality of decryption keys is present, during a predetermined rather extended time always at least one decryption key thereof may be valid. By way of example, the validity of each separate decryption key may be for two uniquely prespecified months, whilst 18 different keys are present in total, yielding an overall validity of 36 months. Alternatively, a single key with a validity period of three years could have been written. The decryption keys are written at delivery time of the CDROM disc and are specific, but not necessarily unique to the intended user station as represented by the station key thereof: various stations could have the same station key, although the number of stations having a particular station key should be a small fraction of all stations.

An elementary type of decryption organization is that the single decryption key is read from the write part of the disc. To this effect the key proper may be packetized in a standard data format. The key extracted therefrom may be used in a standard decryption method, such as RSA, DES, or otherwise. First, the key is tested by the processor on actual validity. A simple feature is that the key package contains in the clear an indication on its validity period. In case of an invalid key, this is signalled to the user person. Thereupon, the system may either prove unusable completely, or the intended service is only rendered on a lower level. If a plurality of decryption keys is present on the write part, the correct one is accessed by the processor, for example, by searching for the correct validity period. After the correct one has been found, the system is rendered operative. If no correct one can be found the system reacts as explained for a single invalid key.

For a system using an aggregate key based on both the station key and the decryption key from the disc, the process is as follows. Upon loading the CDROM in the station, first the station key is combined with the actually valid decryption key from the disc. The combining may be done in any way known in digital mathematics, such as finite field addition, multiplication, or a combination thereof, thereby constituting an actual aggregate key. The actual aggregate key is now used for decrypting the secondary information that had been encrypted in a variable manner, as determined by the actual instant in time. Note that the validity of the secondary information is of the order of one hour or so. In similar way, the standard information is decrypted by means of a combination of the station key and further decryption key information from the CDROM disc. However, in contradistinction to the secondary information, the encryption of the information on the disc is generally uniform in time, so that the aggregate decryption key in this respect must be invariable. Also here, the required decryption may be limited to a particular fraction of the information. The aggregate keys, both for the disc information, and for the secondary information must be uniform for the respective stations and discs. A particular realization is that the time-variant aggregate key is produced by the addition of the actual decryption key from the disc to the station key.

After the predetermined validity time of the disc has terminated, various procedures are feasible. The first one is that a new disc must be acquired, that has new decryption codes thereon, and if applicable, updated standard information. A second one is that the standard information is maintained as is, but new decryption codes are overwritten over, or in addition to, the old ones. This may require full rewriting facility for the write part of the disc.

FIG. 2 shows a decryption key system for the invention, together with the two categories of data. Block 50 represents four successive decryption keys stored in the write part of the CDROM in question. The fields comprise an address A that may indicate the period of validity, and a data subfield B that comprises the key proper. Block C represents the station key. Indication 54 represents the combining of the station key with an invariable part of the information of the write part. This may be one of the normal decryption codes, or another code. The result is a steady key that is stored in register 58 of the station. Information from read element 32 may in processing cell 60 be decrypted to yield the necessary information to processor 26. In a period-variable manner, the information from the successive decryption key fields 50 is combined with the fixed station key 52 to result 66 that is stored in register 62 of the station. Information received on antenna 22, or information selected therefrom as present in element 24 in FIG. 1 may then in processing cell 64 be decrypted to yield the necessary information to processor 26. Processing cells 60, 64 and associated registers may be mapped on appropriate hardware of the station. The combining of the keys may be by digital addition, multiplication, division, and other in a finite field.

What is claimed is:

1. A database system comprising an individual station having berth means for receiving an optically readable information carrier with local information, and read means for reading said carrier, receiving means for receiving remotely supplied secondary information, processing means for processing local information so read and also said secondary information to produce output information, and user interface means for presenting said output information to a user, characterized in that said carrier has a read-only part, and furthermore a write part accommodating storage of at least one decryption key, said processing means being arranged for decrypting said secondary information using said at least one decryption key.

2. A database system as claimed in claim 1, said write part accommodating a plurality of locations for a plurality of respective decryption keys, and said processing means being arranged for selecting among said plurality of decryption keys according to a predetermined selecting time schedule, for decrypting said secondary information in a time limited manner using the decryption key so selected.

3. A database system as claimed in claim 1, wherein said individual station comprises an individual station key, and anyone of said at least one decryption key is privy to said individual station key.

4. A database system as claimed in claim 3, said processing means being arranged for decrypting said secondary information using a first aggregate of said individual station key and said at least one decryption key, which first aggregate varies with said decryption key.

5. A database system as claimed in any of claim 1, wherein said write part is write-once.

6. A database system as claimed in any of claim 1, wherein said processing means are arranged for using said local information and said secondary information in a land vehicle information context.

7. A database system as claimed in any of claim 1, wherein said station is arranged for decrypting said local information using a second aggregate of the station key and a decryption key present on said carrier, which second aggregate is invariant to said actually selected decryption key.

8. A database system as claimed in claim 1 and having write means for writing a particular selection from said secondary information on said write part.

9. A database supersystem comprising a multitude of individual database systems as claimed in claim 7, wherein said second aggregate is uniform in time while using a single said carrier.

10. A database supersystem comprising a multitude of individual database systems as claimed in claim 4, wherein any of said first or second aggregates is instantaneously uniform over said individual database systems.

11. A motor vehicle comprising a database system as claimed in claim 1.

12. A data carrier for use with a database system as claimed in claim 1.

13. A device for combining a first set of information generated remotely from the device and a second set of information from an optically readable record carrier readable by the device, wherein the record carrier includes a decryption key encrypted therein, said device comprising:

means for reading the first set of information and the decryption key from the record carrier;

means for receiving the second set of information generated remotely from the device;

means for processing the first and second sets of information to produce output information to the user of the device, the output information including information from the second set of information from the record carrier and only those portions of the first, remotely generated set of information decryptable with said decryption key read from the record carrier.

14. A device according to claim 13, wherein the record carrier includes a read-only part containing said second set of information and a write part containing said decryption key.

15. A device according to claim 14, said write part accommodating a plurality of locations for a plurality of respective decryption keys, and said processing means being arranged for selecting among said plurality of decryption keys according to a predetermined selecting time schedule, for decrypting said secondary information in a time limited manner using the decryption key so selected.

16. A device according to claim 15, wherein said individual station comprises an individual station key, and anyone of said at least one decryption key is privy to said individual station key.

17. A device according to claim 16, said processing means being arranged for decrypting said secondary information using a first aggregate of said individual station key and said at least one decryption key, which first aggregate varies with said decryption key.

18. A device according to claim 13, wherein said individual station comprises an individual station key, and anyone of said at least one decryption key is privy to said individual station key.

19. A device according to claim 18, said processing means being arranged for decrypting said secondary information using a first aggregate of said individual station key and said at least one decryption key, which first aggregate varies with said decryption key.

\* \* \* \* \*